(12) United States Patent
Hanasaki et al.

(10) Patent No.: US 7,361,839 B2
(45) Date of Patent: Apr. 22, 2008

(54) ELECTROMAGNETIC WELDING METHOD AND CONDUCTOR MODULE

(75) Inventors: Kenichi Hanasaki, Shizuoka (JP); Tomokatsu Aizawa, Tokyo (JP)

(73) Assignee: Yazaki Corporation, Tokyo (JP)

( * ) Notice: Subject to any disclaimer, the term of this patent is extended or adjusted under 35 U.S.C. 154(b) by 0 days.

(21) Appl. No.: 11/499,771

(22) Filed: Aug. 7, 2006

(65) Prior Publication Data

US 2007/0029103 A1 Feb. 8, 2007

(30) Foreign Application Priority Data

Aug. 8, 2005 (JP) ............................. 2005-229920

(51) Int. Cl.
*H01R 4/00* (2006.01)
(52) U.S. Cl. ...................... 174/84 R; 174/90
(58) Field of Classification Search ................ 174/36, 174/74 R, 84 R, 117 F, 117 FF, 88 R; 439/15, 439/67, 164, 492, 495
See application file for complete search history.

(56) References Cited

U.S. PATENT DOCUMENTS

| 4,821,944 | A | * | 4/1989 | Tsumura ................ 228/110.1 |
| 5,134,249 | A | * | 7/1992 | Adachi ..................... 174/92 |
| 5,383,788 | A | * | 1/1995 | Spencer ..................... 439/67 |
| 5,824,998 | A | * | 10/1998 | Livshiz et al. .............. 219/617 |
| 5,962,813 | A | * | 10/1999 | Shirako et al. ........... 174/88 R |
| 6,135,829 | A | * | 10/2000 | Johnston .................... 439/874 |
| 6,247,977 | B1 | * | 6/2001 | Tanaka et al. .............. 439/874 |
| 6,255,590 | B1 | * | 7/2001 | Sato ........................ 174/84 R |
| 6,444,910 | B1 | * | 9/2002 | Goto ....................... 174/70 B |
| 2002/0062979 | A1 | * | 5/2002 | Murakami et al. ........ 174/117 F |
| 2002/0117327 | A1 | * | 8/2002 | Ono .......................... 174/250 |

FOREIGN PATENT DOCUMENTS

| JP | 05-121139 | A | * | 5/1993 |
| JP | 05-121139 | A | * | 5/1993 |
| JP | 11-192562 | | | 7/1999 |

* cited by examiner

*Primary Examiner*—William H. Mayo, III
(74) *Attorney, Agent, or Firm*—Kratz, Quintos & Hanson, LLP

(57) ABSTRACT

An electromagnetic welding method includes the steps of piling a metal plate and an electric wire on a coil which generates a magnetic field when a current is applied into the coil, with a core wire portion of a central part of the electric wire being exposed while core wire portions except the exposed core wire portion are coated with a coating member. The coil and the exposed core wire portion are arranged lined up along a diameter direction of the electric wire, and a current is applied into the coil to generate a magnetic field so as to generate an eddy current in both the metal plate and the exposed core wire portion, thereby welding the metal plate to the exposed core wire portion.

5 Claims, 4 Drawing Sheets

ELECTROMAGNETIC WELDING METHOD AND CONDUCTOR MODULE

BACKGROUND OF THE INVENTION (1) Field of the Invention

The present invention relates to an electromagnetic welding method for welding a metal plate to a core wire of an electric wire and to a conductor module in which a metal plate is welded to a core wire of an electric wire.

(2) Description of the Related Art

For example, a wiring harness mounted on a motor vehicle includes electric wires and terminal fittings as metal plates attached to ends of the electric wires. The electric wire includes a core wire and an electrically insulating coating for coating the core wire. The core wire consists of a plurality of element wires made of metal such as copper. The terminal fitting is formed by bending a flat sheet metal made of electrically conductive metal.

So far, when the terminal fitting is electrically and mechanically connected to the electric wire, a part of the terminal fitting is caulked to the electric wire. Therefore, for example, if the wiring harness is mounted on a motor vehicle, vibrations during travelling of the motor vehicle causes the electrical connection between the terminal fittings and the electric wires to be unstable.

When a metal plate such as the terminal fitting is welded to a core wire of the electric wire, for example, an electromagnetic welding method (for example, see Japanese Patent Application Laid-Open No. H11-192562) may be used.

If a metal plate is welded to a core wire of an electric wire by using the electromagnetic welding method disclosed in Japanese Patent Application Laid-Open No. H11-192562, since the core wire is exposed at end parts of the electric wire and since there is a bias in a distribution of electromagnetic force (i.e. force in a direction in which the metal plate adheres to the core wire) on a surface of the metal plate, therefore the element wires of the core wire might disperse undesirably. If the element wires disperse, each of the element wires moves during welding, resulting in that the core wire might fail to be welded to the metal plate or that the welding area thereof might be very small and therefore, this welding method might not be appropriate for connection between the terminal fitting and the electric wire.

SUMMARY OF THE INVENTION

It is therefore an objective of the present invention to solve the above problem and to provide an electromagnetic welding method, by which a core wire of an electric wire can be welded to a metal plate without having such a problem that element wires of the core wire disperse, and also to provide a conductor module, in which a core wire of an electric wire is welded to a metal plate without having the problem that the element wires of the core wire disperse.

In order to attain the above objective, the present invention is to provide an electromagnetic welding method including the steps of:

piling a metal plate and an electric wire on a coil which generates a magnetic field when a current is applied into the coil, a core wire portion of a central part of the electric wire being exposed while core wire portions except the exposed core wire portion being coated with a coating member, the coil and the exposed core wire portion being arranged lined up along a diameter direction of the electric wire; and applying a current into the coil to generate the magnetic field so as to generate an eddy current in both the metal plate and the exposed core wire portion, thereby welding the exposed core wire portion to the metal plate.

With the construction described above, since the core wire portions except the exposed core wire portion are coated with the a coating member, therefore the element wires of the core wire are prevented from dispersing even if a distribution of electromagnetic force has a bias.

The coil may be a conductor having any shape such as a so-called coil in which an electrically conductive wire is wound up in a coil-shape (i.e. spiral shape), an electrically conductive wire formed in a straight line-shape or a metal plate having a flat plate-shape.

With the construction described above, since the coating member restricts the element wires to shift, therefore the exposed core wire portion can be securely welded to the metal plate on such a condition that a desired welding area can be attained.

Preferably, the core wire includes a plurality of element wires, wherein a plurality of the element wires of the exposed core wire portion are positioned in parallel to each other without overlapping with each other above a surface of the metal plate.

With the construction described above, the core wire can be welded to the metal plate on a condition that the electromagnetic force does not shift the element wires in the diameter direction of the electric wire.

Since a contact area between the core wire and the metal plate is large, therefore the electric wire can be prevented from shifting on the metal plate even if the electromagnetic force has a bias in its distribution.

That is, the electromagnetic force acts only to adhere the element wires to the metal plate, therefore a loss of the electromagnetic force can be prevented from occurring. That is, the element wires (i.e. core wire) can securely adhere to the metal plate, therefore the core wire of the electric wire can be securely welded to the metal plate.

Preferably, the exposed core wire portion is positioned above the metal plate being situated off a center of the metal plate in a direction in which the current flows.

With the construction described above, the electromagnetic force causing the core wire to adhere to the metal plate can be secured. Therefore, the element wires (i.e. core wire) can more securely adhere to the metal plate and therefore, the core wire can be more securely welded to the metal plate.

In order to attain the above objective, the present invention is to provide a conductor module including:

a metal plate; and an electric wire, a core wire portion of a central part of the electric wire being exposed while core wire portions except the exposed core wire portion being coated with a coating member, wherein the metal plate and the electric wire are piled on a coil which generates a magnetic field when a current is applied into the coil, and the coil and the exposed core wire portion are arranged lined up along a diameter direction of the electric wire, wherein a current is applied into the coil to generate the magnetic field so as to generate an eddy current in both the metal plate and the exposed core wire portion, so that the exposed core wire portion is welded to the metal plate.

With the construction described above, since the core wire portions except the exposed core wire portion are coated with the coating member, therefore the element wires of the core wire are prevented from dispersing even if a distribution of electromagnetic force has a bias. Therefore, the exposed core wire portion can be securely welded to the metal plate on such a condition that a desired welding area can be attained.

DESCRIPTION OF THE PREFERRED EMBODIMENTS

Figure 1:
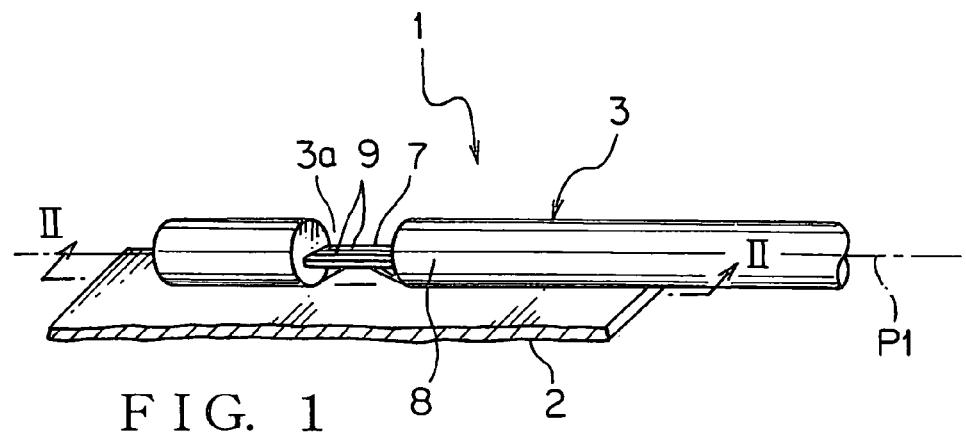
FIG. 1 is a perspective view illustrating a conductor module assembled by using an electromagnetic welding method according to a preferred embodiment of the present invention.
Figure 2:
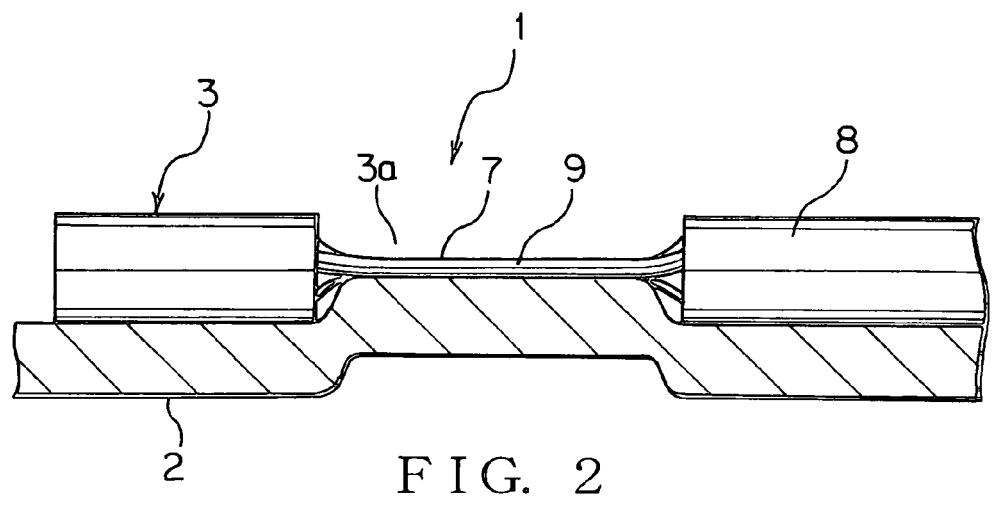
FIG. 2 is a cross sectional view taken along II-II line in FIG. 1.

In the following, the preferred embodiments of the present invention will be explained with reference to FIGS. 1-10. A conductor module 1 shown in FIG. 1 is assembled by using an electromagnetic welding method according to a preferred embodiment of the present invention. As shown in FIGS. 1 and 2, the conductor module 1 includes a metal piece 2 as the metal plate and an electric wire 3.

The metal piece 2 consists of electrically conductive metal and is formed in a flat plate-shape. The metal piece 2 is rectangular in its plan view.

Figure 5:
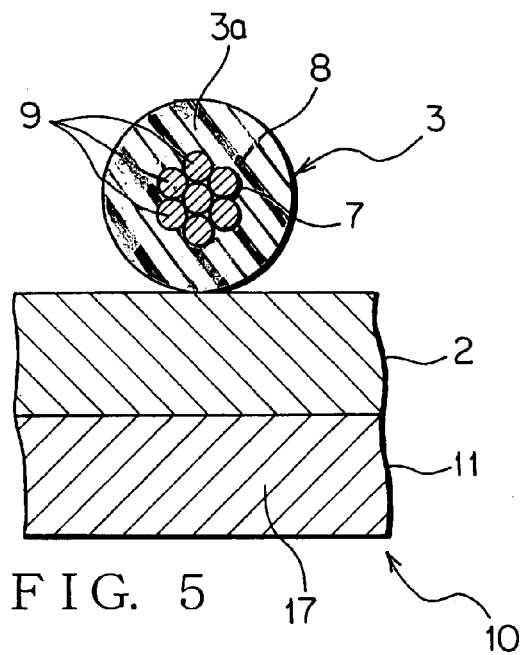
FIG. 5 is a cross sectional view taken along V-V line in FIG. 4.

The electric wire 3 is round in its cross sectional view. As shown in FIG. 5, the electric wire 3 is a so-called coated wire including a core wire 7 and a coating 8 as the coating member which coats the core wire 7. The core wire 7 consists of a plurality of element wires 9 each made of electrically conductive metal. A plurality of the element wires 9 are twisted together to form the core wire 7. The element wire 9 is flexible, that is, the core wire 7 is flexible. In FIG. 5, as an example, the core wire 7 consists of seven element wires 9.

The coating 8 consists of electrically insulating flexible synthetic resin.

A portion of the coating 8 at a central part 3a of the electric wire 3 is removed, so that the core wire 7 is exposed there, that is, an exposed core wire portion is formed there.

That is, the core wire 7 is exposed at the central part 3a of the electric wire 3. The central part 3a means any part of the electric wire 3 except a very end part of the electric wire 3. Portions of the core wire 7 (i.e. core wire portions) except the exposed core wire portion are coated with the coating 8.

In the conductor module 1, the metal piece 2 is welded to the core wire 7 in such a manner that the element wires 9 of the exposed core wire portion located at the central part 3a are piled on the metal piece 2. The element wires 9 of the exposed core wire portion are positioned in parallel to each other without overlapping with each other on a surface of the metal piece 2.

Figure 3:
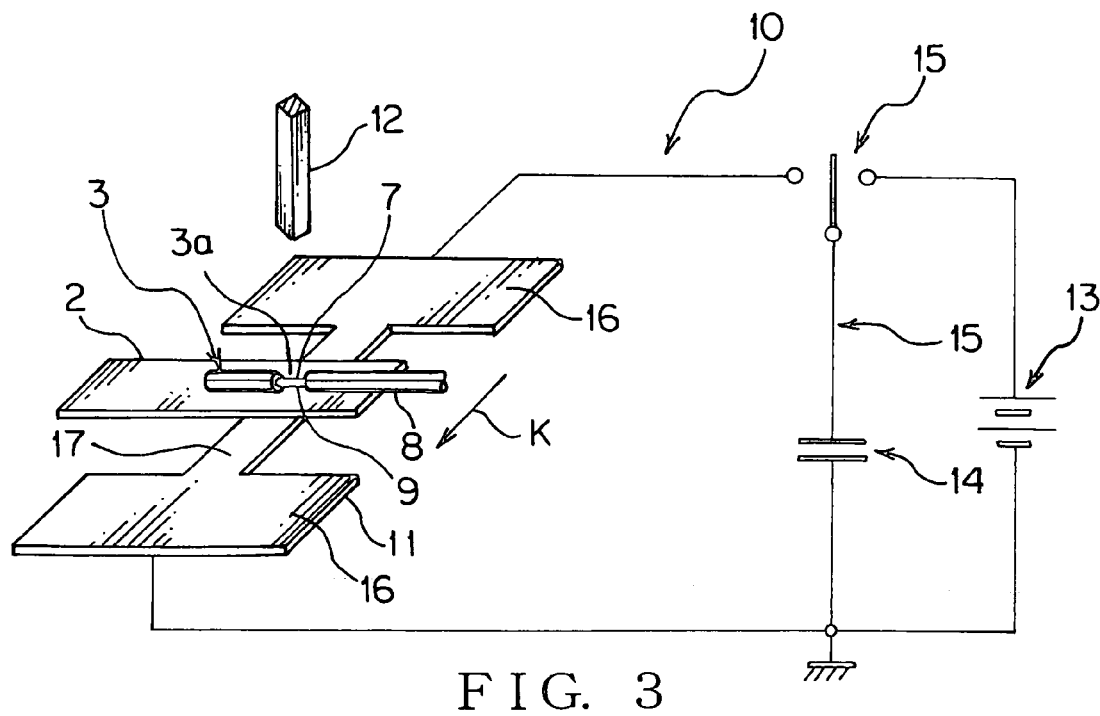
FIG. 3 is a view illustrating a construction of an electromagnetic welding device used when the conductor module shown in FIG. 1 is assembled.

The metal piece 2 and the element wires 9 of the exposed core wire portion located at the central part 3a of the electric wire 3 are welded to each other by an electromagnetic welding device 10 (shown in FIG. 3), thereby obtaining the conductor module 1. As shown in FIG. 3, the conductor module 1 includes a coil 11, fixing tool 12, power source 13, capacitor 14 and switch 15.

The coil 11 is made of electrically conductive metal and formed in a flat plate-shape. That is, the coil 11 is formed of a metal plate. The coil 11 includes integrally a pair of wide parts 16 and a narrow part 17. The wide parts 16 are spaced from each other. A shape of the wide part 16 in its plan view is rectangular. Widths of the pair of the wide parts 16 in a direction crossing at right angles a direction (shown by an arrow K in FIG. 3) in which a current (explained later on) flows are the same and are set so as to allow a sufficient amount of the current to flow.

The narrow part 17 is disposed between the pair of the wide parts 16. Both ends of the narrow part 17 continue to the respective wide parts 16. The narrow part 17 is rectangular in its plan view. The longitudinal direction of the narrow part 17 is parallel to the direction of the arrow K in which the current flows. A width of the narrow part 17 in the direction crossing at right angles the direction of the arrow K in which the current flows is smaller than the width of the wide part 16 in the direction crossing at right angles the direction of the arrow K in which the current flows and is set to allow the current to flow intensively.

When the current flows in the coil 11, the coil 11 generates a magnetic field, that is, generates a magnetic flux (shown by arrows G in FIG. 9) around an axis P (shown by an alternate long and short dash line in FIG. 7) that divides a thickness and a width of the coil 11 into respective two equal parts. The metal piece 2 and the electric wire 3 can be placed on a surface of the coil 11.

The coil 11 generates a magnetic field when a current flows in the coil 11. The coil 11 may be a conductor having any shape such as a so-called coil in which an electrically conductive wire is wound up in a coil-shape (i.e. spiral shape), an electrically conductive wire formed in a straight line-shape or a metal plate having a flat plate-shape.

The fixing tool 12 is formed in a square pole-shape and an end surface 12a of the fixing tool 12 faces a surface of the coil 11 having a distance therebetween. The end surface 12a of the fixing tool 12 can approach and leave the coil 11. The metal piece 2 and the exposed core wire portion located at the central part 3a of the electric wire 3 can be put between the fixing tool 12 and the coil 11. At that time, the end surface 12a of the fixing tool 12 is placed on the exposed core wire portion.

The capacitor 14 is connected to the power source 13 or the coil 11 through the switch 15. The capacitor 14 stores electric charges up to a predetermined amount of electric energy. One contact (the first contact) of the switch 15 is connected to one wide part 16 of the pair of the wide parts 16 of the coil 11, while the power source 13 and the capacitor 14 are connected to another wide part 16 of the pair of the wide parts 16. Another contact (the second contact) of the switch 15 is connected to the power source 13. Further contact (the third contact) of the switch 15 is connected to the capacitor 14.

The switch 15 is to select one condition among three conditions consisting of a condition in which electric energy from the power source 13 is supplied to the capacitor 14, a condition in which electric energy stored in the capacitor 14 is supplied to the coil 11, and a condition in which electric energy from the power source 13 is not supplied to the capacitor 14 and electric energy stored in the capacitor 14 is not supplied to the coil 11.

On the condition that the switch 15 supplies the electric energy stored in the capacitor 14 to the coil 11, the capacitor 14 outputs the stored electric energy to the one wide part 16 through the switch 15 at one try. That is, the capacitor 14 allows a large current (larger than a current from the power source 13) to flow into the coil 11 instantaneously.

In the electromagnetic welding device 10, a pair of subjects to be welded to each other is placed on the coil 11, then on a condition that the subjects to be welded are put between the fixing tool 12 and the coil 11, the electric charges from the power source 13 is stored in the capacitor 14 up to a predetermined amount of electric energy by the switch 15 and then, a large current is allowed to flow into the coil 11 instantaneously from the capacitor 14 by the switch 15. That is, the magnetic flux is applied to the pair of the subjects to be welded placed on the coil 11 so as to generate an eddy current in the subjects to be welded, so that the subjects to be welded are heated. At that time, the electromagnetic welding device 10 generates an electromagnetic force to bring the subjects close to each other (i.e. to allow the subjects to collide with each other) instantaneously by the eddy current and the magnetic field. Thus, the electromagnetic welding device 10 allows the heated subjects to collide with each other instantaneously by the electromagnetic force so as to weld (i.e. mechanically join) the subjects to each other.

When the conductor module 1 is assembled, that is, when the metal piece 2 and the core wire 7 are fixed to each other, the coating 8 located at the central part 3a (in the figures as an example, of course the central part 3a being not located at very end part of the electric wire 3 but located to some extent near to one end of the electric wire 3) of the electric wire 3 is removed in advance to expose the pertinent portion of the core wire 7 located at the central part 3a.

Figure 4:
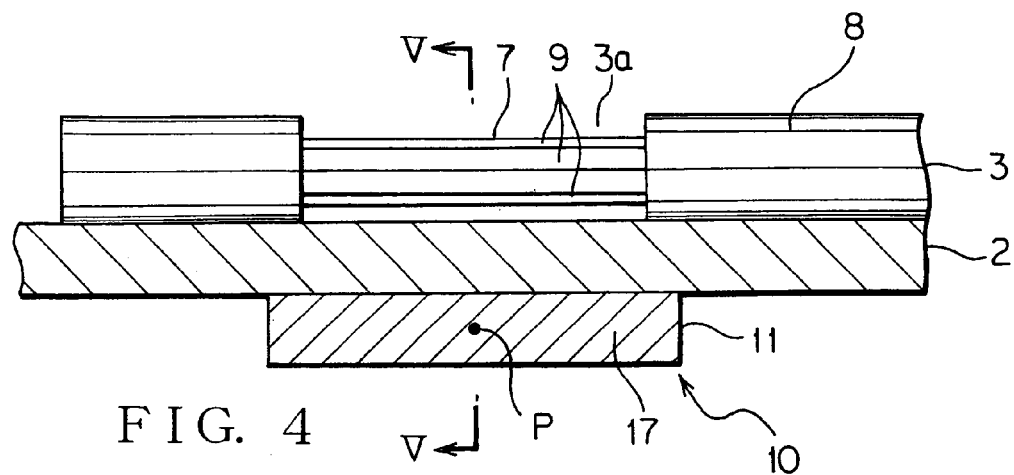
FIG. 4 is a view including partially a cross section illustrating a state when a metal piece and an electric wire are piled on a coil of the electromagnetic welding device shown in FIG. 3.

Then, as shown in FIG. 4, the metal piece 2 is piled on the narrow part 17 of the coil 11 and further, the electric wire 3 is piled on the metal piece 2. At that time, of course the switch 15 is set to select the condition that the electric energy from the power source 13 is not supplied to the capacitor 14 and the electric energy stored in the capacitor 14 is not supplied to the coil 11. Further, the longitudinal direction of the metal piece 2 is set parallel to that of the electric wire 3 and the exposed core wire portion located at the central part 3a of the electric wire 3 is positioned above the narrow part 17 of the coil 11. That is, the narrow part 17 of the coil 11 and the exposed core wire portion located at the central part 3a are arranged lined up along a diameter direction of the electric wire 3. At that time, since the coating 8 of the electric wire 3 coats the core wire portions except the exposed core wire portion, therefore as shown in FIG. 5, there is a space between the exposed core wire portion and the metal piece 2 (that is, the exposed core wire portion and the metal piece 2 having a distance therebetween).

Figure 6:
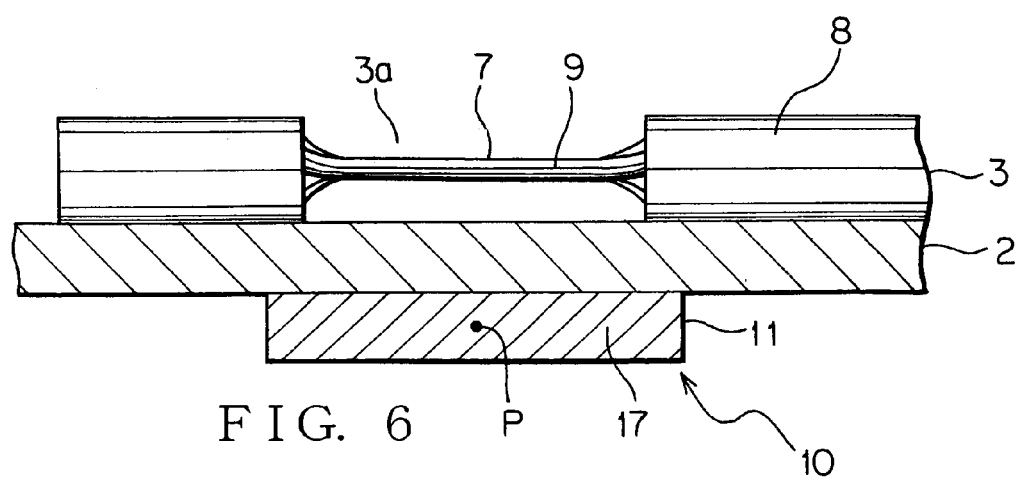
FIG. 6 is a view including partially a cross section illustrating a state when a twist of element wires of a core wire shown in FIG. 4 is untangled and the untangled element wires are arranged in parallel to each other above a surface of the metal piece.
Figure 7:
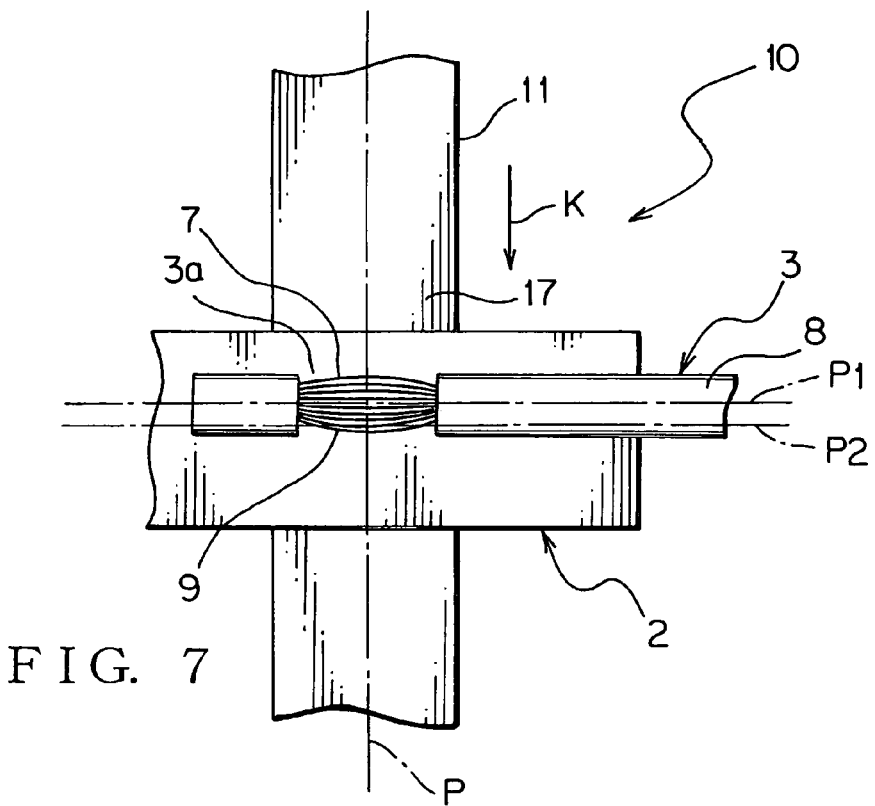
FIG. 7 is a plan view of the electric wire, metal piece and so on shown in FIG. 6.

Thereafter, as shown in FIGS. 6 and 7, the element wires 9 twisted together of the core wire 7 of the central part 3a are untangled and the untangled element wires 7 are arranged in parallel to each other above a surface of the metal piece 2. That is, the untangled element wires 7 are positioned in parallel to each other without overlapping with each other above the surface of the metal piece 2. The electric wire 3 is positioned on the metal piece 2 in such a manner that an axis P1 (shown by an alternate long and short dash line in FIG. 7) of the electric wire 3 does not coincide with an axis P2 (also shown by an alternate long and short dash line in FIG. 7; the axis P2 dividing a thickness and a width of the metal piece 2 into respective two equal parts) of the metal piece 2. That is, the electric wire 3 is placed on the metal piece 2 being situated off a center of the metal piece 2 in a direction in which the current flows. That is, the exposed core wire portion is positioned above the metal piece 2 being situated off a center of the metal piece 2 in the direction in which the current flows.

Figure 8:
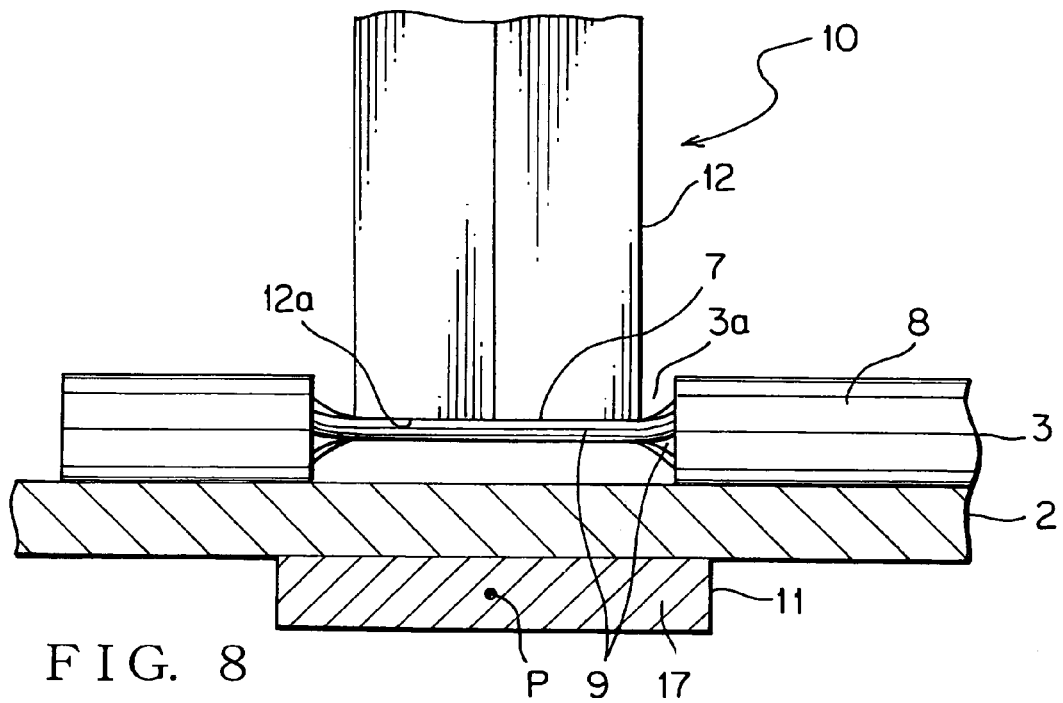
FIG. 8 is a view including partially a cross section illustrating a state when a fixing tool is placed on an exposed core wire portion of a central part of the electric wire shown in FIG. 6.
Figure 9:
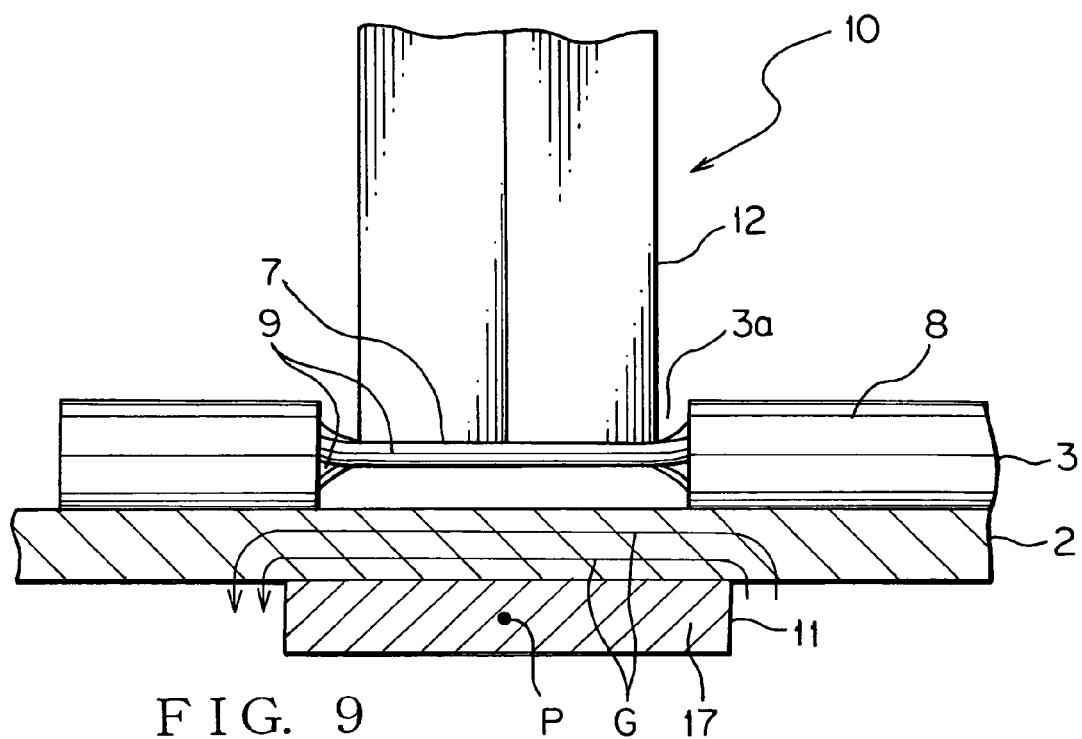
FIG. 9 is a view including partially a cross section illustrating a state when a magnetic flux is generated on an outer circumference of a coil shown in FIG. 8.

Thereafter, as shown in FIG. 8, the end surface 12a of the fixing tool 12 is placed on the exposed core wire portion of the central part 3a. Thus, the exposed core wire portion is pressed by the fixing tool 12. Then, the switch 15 is operated to store the electric charges from the power source 13 in the capacitor 14. After a predetermined amount of electric energy is stored in the capacitor 14, the switch 14 is operated to supply the electric charges stored in the capacitor 14 to the coil 11 through the switch 15 as shown in FIG. 9. Then, a large current (larger than a current from the power source 13) instantaneously flows into the coil 11.

Then, a magnetic field is generated around the coil 11, that is, a high density magnetic flux shown by an arrow G in FIG. 9 is instantaneously generated between the metal piece 2 and the narrow part 17 of the coil 11, between the metal piece 2 and the exposed core wire portion and between the fixing tool 12 and the exposed core wire portion. When the magnetic flux G crosses the metal piece 2 and the exposed core wire portion, an induced current called an eddy current flows in the metal piece 2 and the exposed core wire portion according to their electrical conductivity. Then, the metal piece 2 and the exposed core wire portion are heated by the eddy current. Further, an electromagnetic force in a direction in which the metal piece 2 and the exposed core wire portion approach each other (i.e. press each other) is generated by the eddy current and the magnetic field.

Figure 10:
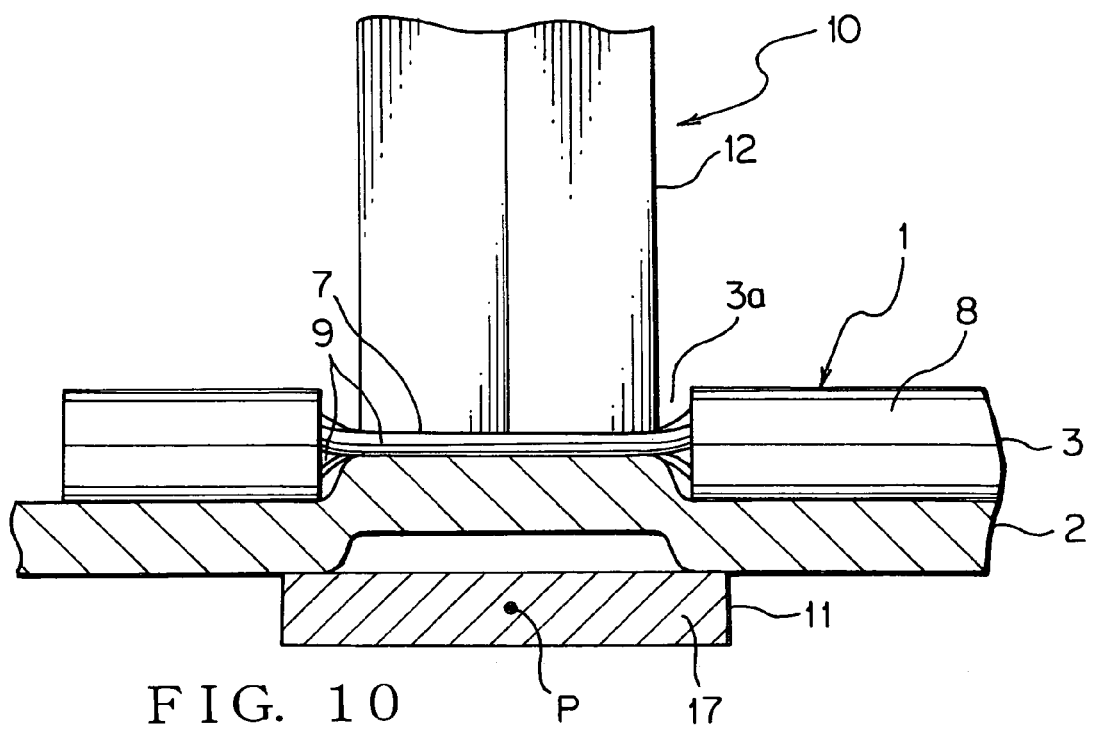
FIG. 10 is a view including partially a cross section illustrating a state when the metal plate and the core wire of the electric wire shown in FIG. 9 are welded to each other.

Then, as shown in FIG. 10, the metal piece 2 and the exposed core wire portion, which are placed one upon another, heated by the eddy current and brought close to each other by the electromagnetic force, are allowed to adhere to each other. That is, the metal piece 2 and the exposed core wire portion are bonded together by metallic bond, that is, welded to each other by so-called electromagnetic welding. Thus, the conductor module 1 is obtained.

According to the preferred embodiment described above, since the core wire portions except the exposed core wire portion at the central part 3a of the electric wire 3 are coated with the coating 8, therefore the element wires 7 of the core wire 7 are prevented from dispersing even if a distribution of the electromagnetic force has a bias. Since the coating 8 restricts the element wires 9 to shift during the welding, therefore the exposed core wire portion can be securely welded to the metal piece 2 on such a condition that a desired welding area can be attained.

Since the element wires 9 of the exposed core wire portion are positioned in parallel to each other without overlapping with each other above a surface of the metal piece 2, therefore the core wire 7 can be welded to the metal piece 2 on a condition that the electromagnetic force does not shift the element wires 9 in the diameter direction of the electric wire 3.

Since a contact area between the core wire 7 and the metal piece 2 is large, therefore the electric wire 3 can be prevented from shifting on the metal piece 2 even if the electromagnetic force has a bias in its distribution.

That is, the electromagnetic force acts only to adhere the element wires 9 to the metal piece 2, therefore a loss of the electromagnetic force can be prevented from occurring. That is, the element wires 9 (i.e. core wire 7) can securely adhere to the metal piece 2, therefore the core wire 7 of the electric wire 3 can be securely welded to the metal piece 2.

In general, the eddy current described above is generated more in the proximity of outer edges of the metal piece 2 than at a center of the metal piece 2. Since the exposed core wire portion is positioned above the metal piece 2 being situated off a center of the metal piece 2 in the direction in which the current flows, therefore the electromagnetic force that adhere the core wire 7 to the metal piece 2 can be secured. That is, the element wires 9 (i.e. core wire 7) can securely adhere to the metal piece 2, therefore the core wire 7 of the electric wire 3 can be securely welded to the metal piece 2.

In the conductor module 1, since the core wire portions except the exposed core wire portion are coated with the coating 8, therefore the element wires 9 of the core wire 7 are prevented from dispersing during the welding even if a distribution of electromagnetic force generated by the coil 11 has a bias. Therefore, the core wire 7 can be securely welded to the metal piece 2 on such a condition that a desired welding area can be attained.

In the preferred embodiment described above, a capacity of the capacitor 14 is appropriately changed so as to change a frequency of the large current flow, i.e. a frequency of the electromagnetic force generation, so that the collision speed between the core wire 7 and the metal piece 2 can be set an appropriate speed. Since the core wire portions except the exposed core wire portion are coated with the coating 8, therefore the core wire 7 can be spaced from the metal piece 2 before the welding. Therefore, when the large current is applied to the coil 11, the core wire 7 can securely collide against the metal piece 2 as the metal plate by the electromagnetic force, so that the core wire 7 can be securely welded to the metal piece 2.

The metal piece 2 as the metal plate may be formed in such a manner that a surface of a flat plate-shaped body material is subjected to plating. The number of the element wires 9 of the core wire 7 is not limited to seven. That is, the core wire 7 may consist of a plurality of the element wires 9.

In the preferred embodiment described above, the coating 8 as the coating member coats the core wire portions except the exposed core wire portion that is located at the central part 3a of the electric wire 3. However, the core wire portions except the exposed core wire portion may be coated by a tube separated from the electric wire 3 or solder welded on the core wire 7 of the electric wire 3, instead of by the coating 8.

In the preferred embodiment described above, the coil 11 is formed of a metal plate and formed in a flat plate-shape. However, instead, the coil 11 may be a conductor having any shape except a metal plate provided that such a coil 11 generates a magnetic field when a current is applied thereto and concentrates the current in the proximity of the core wire 7 of the electric wire 3.

In the preferred embodiment described above, the metal piece 2 as the metal plate is formed in a flat plate-shape. However, instead, the metal piece 2 as the metal plate may be formed in various shapes such as a tube-shape, plate-shape or half circle-shape. If the metal piece 2 has a caulking piece for caulking the core wire 7 of the electric wire 3, the core wire 7 is further caulked to the metal piece 2 by the electromagnetic force and welded to the metal piece 2 by the electromagnetic welding described above, therefore the core wire 7 can be very firmly fixed to the metal piece 2.

The metal piece 2 as the metal plate and the electric wire 3 may be placed one upon another and positioned between a pair of the coils 11, thereafter the core wire 7 of the electric wire 3 is welded to the metal piece 2.

The aforementioned preferred embodiments are described to aid in understanding the present invention and variations may be made by one skilled in the art without departing from the spirit and scope of the present invention.

What is claimed is:

1. An electromagnetic welding method comprising the steps of:
    piling a metal plate and an electric wire, comprising a plurality of element wires twisted together, on a coil which generates a magnetic field when a current is applied into the coil, a core wire portion of a central part, spaced from ends of the wire, along an axis direction of the electric wire being exposed, in advance of application of any current into the coil, while core wire portions except the exposed core wire portion are coated with a coating member, the coil and the exposed core wire portion being arranged lined up along a diameter direction of the electric wire; and
    applying a current into the coil to generate the magnetic field so as to generate an eddy current in both the metal plate and the exposed core wire portion, thereby welding the exposed core wire portion to the metal plate, wherein each element wire of the exposed core wire portion is completely exposed.

2. The method according to claim 1, wherein the exposed core wire portion is positioned above the metal plate being situated off a center of the metal plate in a direction in which the current flows.

3. A conductor module comprising:
    a metal plate; and
    an electric wire comprising a plurality of element wires twisted together, a core wire portion of a central part along an axis direction of the electric wire being exposed, in advance of application of any current into a coil, while core wire portions except the exposed core wire portion are coated with a coating member,
    wherein the metal plate and the electric wire are piled on the coil which generates a magnetic field when a current is applied into the coil, and the coil and the exposed core wire portion are arranged lined up along a diameter direction of the electric wire, and
    wherein a current is applied into the coil to generate the magnetic field so as to generate an eddy current in both the metal plate and the exposed core wire portion, with each element wire of the exposed core wire portion completely exposed, so that the exposed core wire portion is welded to the metal plate.

4. The method according to claim 1, wherein the plurality of the element wires of the exposed core wire portion are positioned in parallel to each other without overlapping with each other above a surface of the metal plate.

5. The conductor module according to claim 3, wherein the plurality of the element wires of the exposed core wire portion are positioned in parallel to each other without overlapping with each other above a surface of the metal plate.

* * * * *